United States Patent [19]

Nakamura et al.

[11] Patent Number: 4,510,371

[45] Date of Patent: Apr. 9, 1985

[54] METALLIC SCALES AND METHOD OF MANUFACTURING THE SAME

[75] Inventors: Hiromi Nakamura, Ebina; Zenichi Mochizuki, Fuji; Noriyuki Motomura; Sadayoshi Yamada, both of Zama, all of Japan

[73] Assignee: Toshiba Kikai Kabushiki Kaisha, Tokyo, Japan

[21] Appl. No.: 359,530

[22] Filed: Mar. 18, 1982

[51] Int. Cl.³ .............................................. B23K 27/00
[52] U.S. Cl. ...................... 219/121 LM; 219/121 EM
[58] Field of Search ...... 219/121 L, 121 LM, 121 EB, 219/121 EM, 121 P; 324/208; 148/212, 221

[56] References Cited

U.S. PATENT DOCUMENTS

| | | | |
|---|---|---|---|
| 2,914,756 | 11/1959 | Heidenhain et al. | 324/208 X |
| 3,243,692 | 3/1966 | Heissmeier et al. | 324/208 X |
| 3,478,189 | 11/1969 | Estes | 219/81 |
| 4,253,350 | 10/1981 | Ichiyama et al. | 148/9.5 X |

Primary Examiner—C. L. Albritton
Attorney, Agent, or Firm—Koda and Androlia

[57] ABSTRACT

A surface of a linear magnetic bar is subjected to such high density energy as a fine beam of laser rays, electrons, ions, plasma or an electric current to change permeability of portions subjected to the high density energy so as to form graduations spaced uniformly. A magnetic sensor is used to detect variation in the permeability, thus measuring movement, speed or acceleration of the scale relative to the magnetic sensor. The scale may be formed on a movable portion of a machine, for example a piston rod of a die casting machine or an injection molding machine.

16 Claims, 13 Drawing Figures

METALLIC SCALES AND METHOD OF MANUFACTURING THE SAME

BACKGROUND OF THE INVENTION

This invention relates to a metallic scale and a method of manufacturing the same. Such metallic scales are used to measure stroke or displacement of a component element of an automatic machine which operates at a high speed or at a variable speed such as an injection molding machine or a die casting machine. Measuring instruments utilized in such application generally have a short operating life and their characteristics are not always satisfactory. Especially, where the acceleration of the movable element increases to about 20 G, conventional measuring instruments are not yet satisfactory from the standpoints of their life, response speed and cost.

In a die casting machine, high speed metal molding machine or the like, for the purpose of manufacturing products having an excellent quality at a high yield it is essential to strictly control the speed, acceleration and displacement or stroke of a ram connected to the piston rod of a fluid actuator. However, at present it is difficult to avail a measuring instrument when the maximum acceleration of the ram reaches 50 G.

SUMMARY OF THE INVENTION

Accordingly, it is an object of this invention to provide an improved metallic scale and a method of manufacturing the same that can obviate various difficulties of prior art scale described above.

Another object of this invention is to provide a novel metallic scale having uniform and smooth surface provided with accurate graduations that can be sensed by a magnetic sensor to measure displacement, speed and acceleration of the scale relative to the sensor.

Still another object of this invention is to provide a metallic scale which can be formed directly on a portion of a machine which is moved at a high speed or at a variable speed such as a piston rod of a die casting machine or an injection molding machine.

A further object of this invention is to provide a method of manufacturing a metallic scale that can accurately and rapidly graduate the scale with fine lines.

According to one aspect of this invention there is provided a method of preparing a metallic scale comprising the steps of preparing a linear metallic blank, applying at a definite spacing, high density energy in the form of a fine line onto a surface of the linear metallic blank so as to modify physical properties of the blank subjected to the high density energy, the modified portions forming graduations of the metallic scale.

According to another aspect of this invention there is provided a metallic scale comprising a linear magnetic bar and graduations formed on a surface of the magnetic bar, the graduations being formed by subjecting the surface of the magnetic bar to high density energy so as to change permeability thereof.

DESCRIPTION OF THE PREFERRED EMBODIMENTS

Various characteristics of metallic materials change greatly when they are heated to a high temperature or quenched rapidly although the proportion of their ingredients does not vary. The present invention contemplates unique utilization of the change of the characteristics, especially permeability. In alloys containing ferromagnetic metals such as iron, nickel or cobalt, the change in the permeability is remarkable. In a typical magnetic alloy consisting of 20–30% by weight of iron, 70–80% by weight of nickel, when the alloy is cold rolled, heated to 900° C. and then quenched its permeability increases by a factor of 30 to 40. In a case of a structural steel and special steels it is possible to reduce their permeability to 1/7–1/20 by quenching them from a temperature of 970°–1050° C. A metal alloy plated layer consisting of 92–95% by weight of nickel and 5–8% by weight of phosphor and utilized for preventing corrosion or ornamental purpose can increase its permeability by a factor of 20 to 30 by heating it to 300° C. or more.

Typical methods of forming metallic scale on the surface of metallic material by heat treatment and the constructions of the metallic scale and a magnetic sensor will be described hereunder.

First Method

Figure 1:
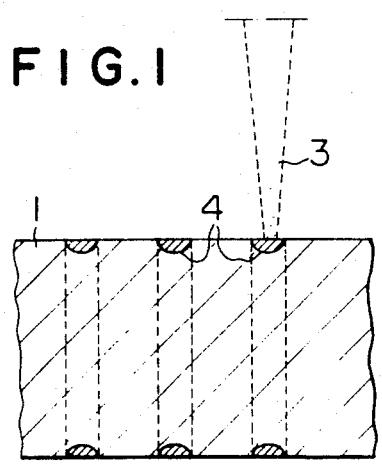
FIG. 1 is a partial longitudinal sectional view of a metallic scale showing the relation among a metal blank, heat modified zones and a high energy beam.
Figure 3:
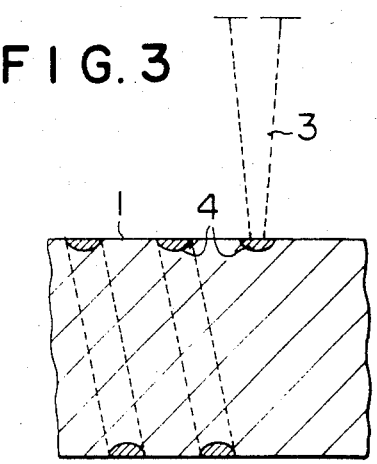
FIG. 3 shows a longitudinal cross-sectional view of a modified embodiment of this invention in which the heat modified portions are formed helically.
Figure 2:
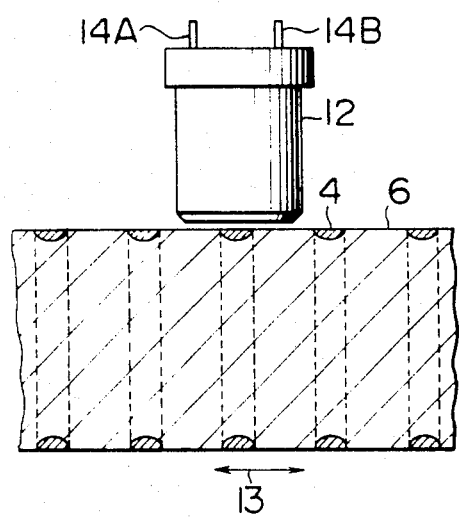
FIG. 2 is a side view, partially in longitudinal section showing the metallic scale shown in FIG. 1 and a magnetic sensor.

As shown in FIG. 1, while rotating a cylindrical blank 1 of metal about its longitudinal axis, a fine high energy beam 3 such as a laser beam, infrared rays or an electron beam is projected upon the surface of the blank 1 to heat it to a high temperature. Since the heat of this portion diffuses rapidly into cold inner portion of the blank it is quenched to form a circumferential portion 4 of modified nature. After forming one modified portion 4, the blank is advanced a predetermined pitch to form another modified portion 4. Accordingly, the modified portions have a definite pitch so that it can be used as a uniformly graduated scale 6. As shown in FIG. 2, by providing a magnetic sensor 12 which detects the modified portions 4 and by relatively moving the sensor and the scale in a direction shown by an arrow 13, the displacement of the scale 6 can be measured. The detail of the magnetic sensor will be described later. Alternatively, by rotating the blank and advancing continuously, a helical modified portion 4 can be formed, as shown in FIG. 3.

Second Method

Figure 5:
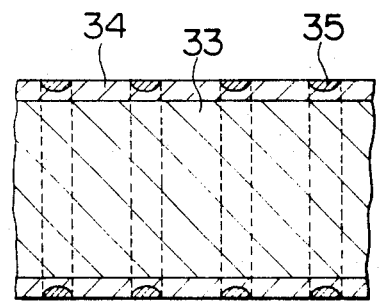
FIG. 5 is a partial longitudinal sectional view showing a modified metallic scale provided with a plated layer.
Figure 4:
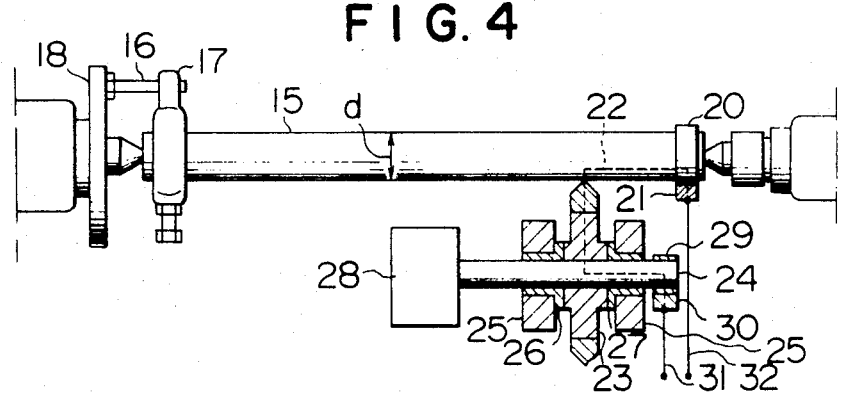
FIG. 4 is a side view of apparatus for manufacturing a metallic scale with a rotary electrode.

In another method shown in FIG. 4, a round rod shaped metal blank 15 is covered by a thin electric insulating film, not shown. One end of the blank is supported by a machining jig 17 rotated by a rotary disc 18 through a pin 16, while the other end is removed of the insulating film and an electroconductive slip ring 20 is fitted on the bared end. A brush 21 is urged against the slip ring 20 to supply electric current to the blank 15. A disc shaped heating roller 23 having a sharp peripheral edge is disposed adjacent the blank to make a line contact therewith by penetrating through the insulating film. The heating roller 23 is mounted on a shaft 24 parallel with the blank 15 and supported by bearings 26 and 27 made of electric insulating material and supported by pedestals 25. The shaft 24 is rotated by a driving device, such as an electric motor 28 provided for one end. An electroconductive slip ring 29 is mounted on the other end of the shaft 24 to which a brush 30 is urged against. Terminals 31 and 33 leading to slip rings 30 and 21 are connected to a source of direct current, not shown, to pass current as shown by dotted lines 22 by breaking the insulating film. At a portion at which the heating roller 23 contacts the blank 15, the current density is extremely high so that a large quantity of heat is generated at the contact portion. Accordingly, modified portions similar to those shown in FIGS. 4 and 5 are formed on the surface of the blank 15, so that it can be used as a scale.

The first method is advantageous where the blank is made of structural steel or an alloy steel because it is possible to make high temperature the portions whose nature is to be changed. With this method, it is possible to manufacture a relatively small scale by using the high energy beam or plasma working machine.

In contrast, according to the second method, as the current is passed through the contact portion of the heating roller it is impossible to raise the temperature above the softening temperature of the blank. However, as the method and apparatus for preparing the scale are relatively simple, this method can be advantageously applied to the manufacture of a relatively large metallic scale as well as a metallic scale comprising a steel core 32 and a plated layer 34 thereon of an alloy of nickel and phosphor, as shown in FIG. 5, in which modified portions are designated by a reference numeral 35.

It is essential that the plated layer 34 should be formed by chemical plating or electrolysis because the alloy layers formed by these methods are amorphous and have a characteristic similar to paramagnetic substance and because they are converted into ferromagnetic substance having a high permeability when heated to a temperature higher than 300° C.

Figure 6:
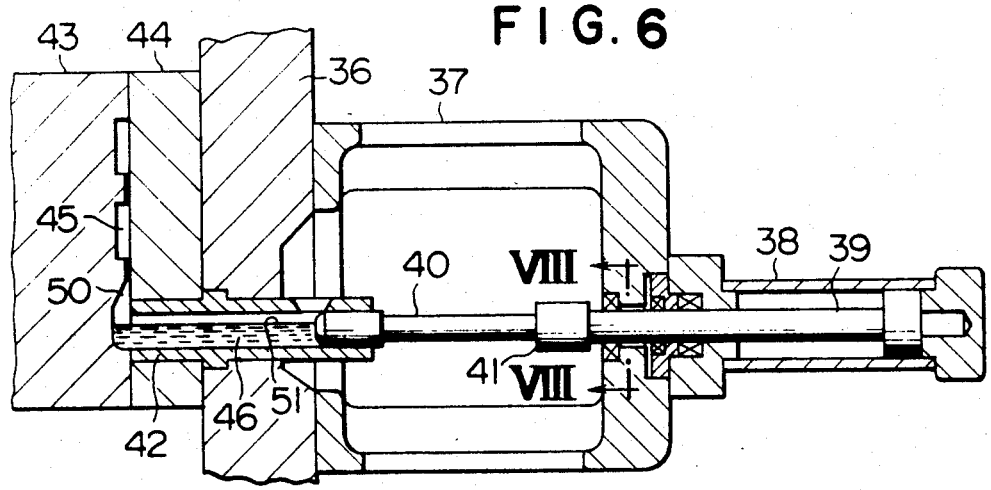
FIG. 6 is a diagrammatic representation showing main component elements of a die casting machine utilizing the scale of this invention.

FIG. 6 shows essential protions of a die casting machine utilizing the scale embodying the invention. As shown, a pressurized oil cylinder 38 is secured to one side of a machine frame 36 via a side frame 37. A piston rod 39 in the cylinder 38 is connected to a ram 40 by a coupling 41, the ram 40 being used to inject molten metal 46 into a mold cavity 45 defined in metal mold halves 43 and 44.

As is well known in a die casting machine or an injection molding machine, the stroke, speed and acceleration of the ram 40 have a great influence upon the quality of the products so that it is necessary to strictly control these factors in order to obtain satisfactory products at a high yield.

Figure 7:
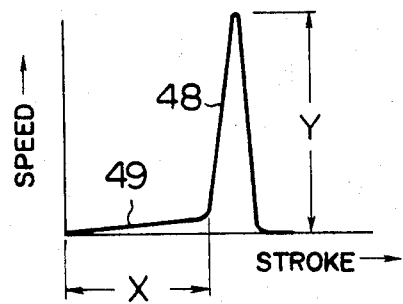
FIG. 7 is a graph showing a speed curve useful to explain the operation of the ram of a die casting machine.

Although an ideal relation between the stroke and speed of the ram differs somewhat depending upon the shape and size of the products, a typical relation is shown in FIG. 7 in which the ordinate represents the speed and the abscissa the stroke or displacement of the ram. In FIG. 7, a high speed portion 48 has the largest influence upon the quality of the products. The appearance, size, strength, etc. of the products are greatly influenced by the starting point X and the magnitude Y of the high speed portion 48, so that it is essential to supervize whether the values of X and Y are optimum or not. Where these values are not optimum the products prepared under these conditions should be rejected. A low speed portion 49 represents an initial stage until the molten metal 46 pushed by the ram reaches the gate 50 of the cavity 45. Under these conditions, the upper surface 51 of the molten metal 46 fluctuates tending to entrain air into the molten metal. To prevent this tendency, the rate of acceleration of the ram must be controlled.

Figure 8:
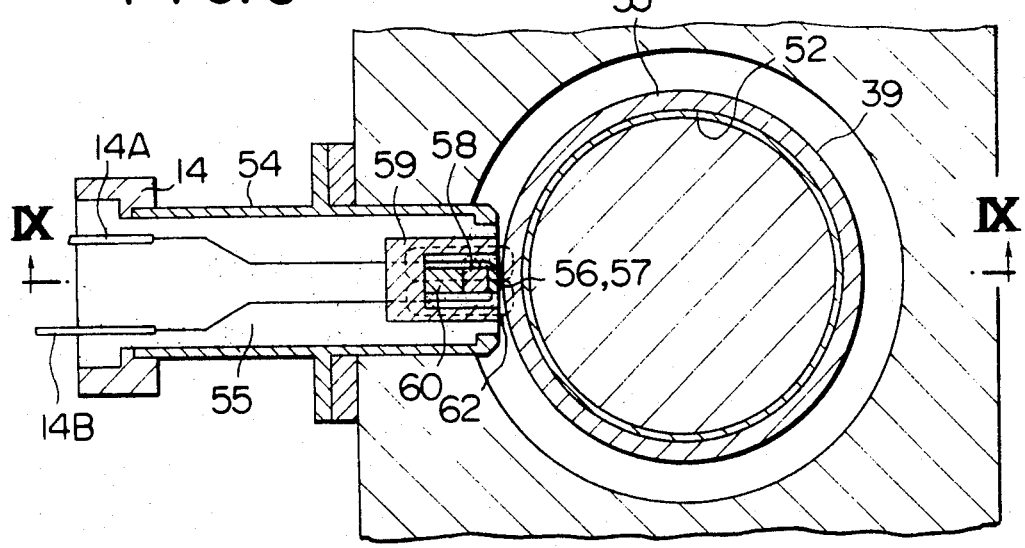
FIG. 8 is a sectional view taken along a line VIII—VIII shown in FIG. 6.
Figure 9:
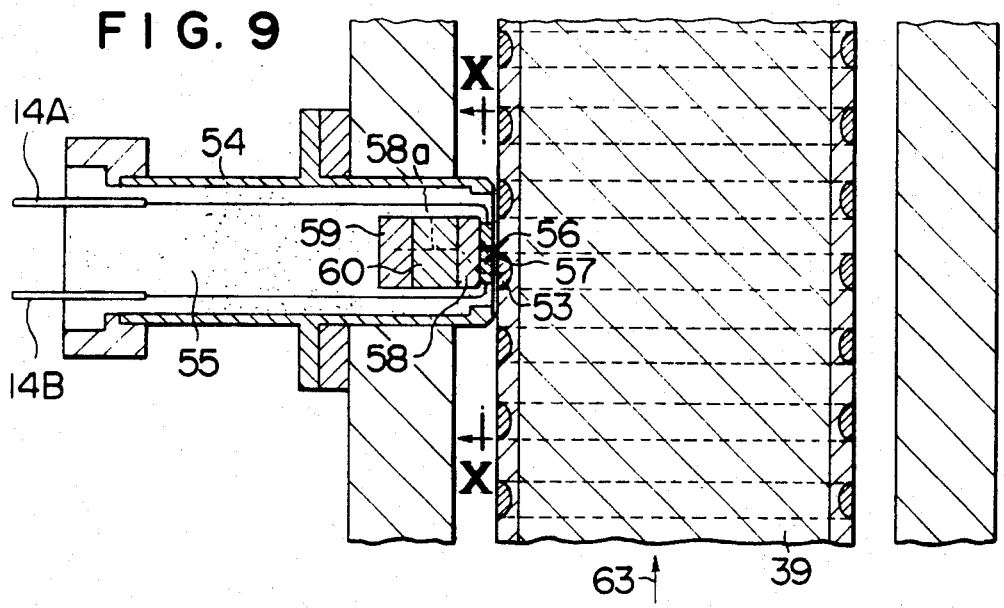
FIG. 9 is a sectional view taken along a line IX—IX shown in FIG. 8.
Figure 10:
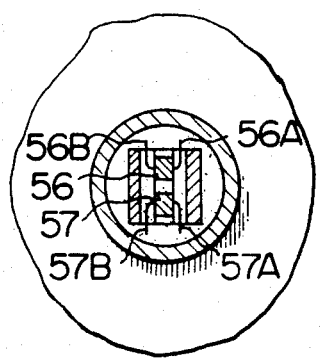
FIG. 10 is a cross-sectional view taken along a line X—X shown in FIG. 9.

As shown in FIGS. 8 and 9, the piston rod 39 is provided with a plated layer 52 formed by chemical plating or electrolysis and consisting of 92% by weight of nickel and 8% by weight of phosphor, and a plurality of modified portions 53 are formed at a regular spacing according to the second method to complete a metallic scale of this invention.

The sensor 14 shown in FIG. 8 comprises a casing 54, magnetic resistance elements 56 and 57, a magnetic spacer 58 made of magnetic material such as permalloy, a permanent magnet 60, a magnetic yoke 59 surrounding the parmanent magnet, the spacer and the magnetic resistance elements, a pair of terminals 14A and 14B connected to the magnetic resistance elements and a powder of electric insulator 55 packed in the casing 54.

In the example shown in FIGS. 8 and 9 the portions 53 have been heat treated to have a high permeability so that when one of the modified portions 53 passes by the magnetic resistance element 57, the most of the magnetic flux flows through magnet 60, spacer 58, magnetic resistance element 57, modified portion 53 and yoke 59 as shown by dotted lines 58a, so that the resistance value of the magnetic resistance element 57 increases. As the piston rod 39 is moved in the direction of arrow 63 shown in FIG. 9 to bring another modified portion 53 to a position confronting the magnetic resistance element 56, then the magnetic flux flows through this element to increase its resistance value and to decrease the resistance value of the magnetic resistance element 57.

Figure 11:
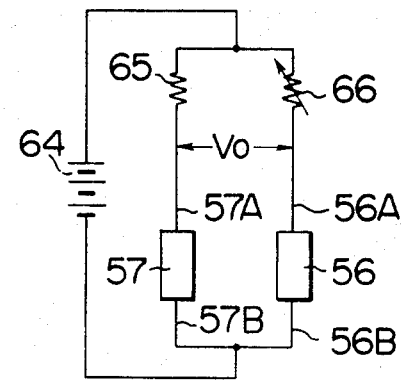
FIG. 11 is a connection diagram showing a magnetic sensor and circuit elements associated therewith.
Figure 12:
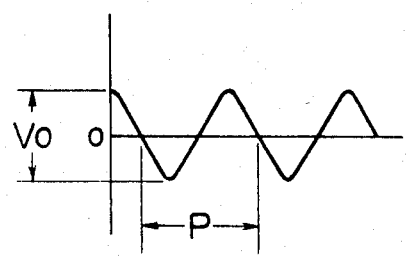
FIGS. 12 and 13 are graphs showing the relation between voltage and displacement.
Figure 13:
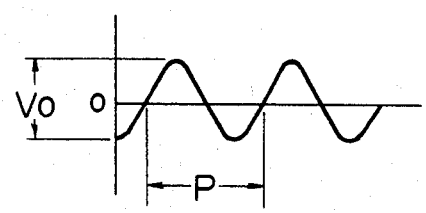

Lead wires 56A, 56B, 57A and 57B respectively connected to the magnetic resistance elements 56 and 57 are connected in a circuit including a battery 64 and resistors 65 and 66 as shown in FIG. 11. Then as the piston rod 39 is moved, an output voltage Vo proportional to the displacement of the piston rod can be measured as shown in FIG. 12. When this output voltage is processed with reference to time it is possible to determine the speed and acceleration of the piston rod. In FIGS. 12 and 13, the ordinate represents the output voltage, the abscissa the displacement of the piston, and P the pitch of the modified portions.

Various data and characteristics of the embodiment described above are as follows:

EXAMPLE 1 diameter of piston 39—70 mm
thickness of plated layer—200μ
pitch of graduation (modified portions)—2 mm
width of modified portion—1 mm
depth of modified portion—150μ
voltage of source 64—5 V
output voltage Vo (peak to peak):
 52.0 mV—piston speed—0.5 m/sec.
 51.7 mV—piston speed—5 m/sec.

As can be noted from these data the output voltage varied only a little although the piston speed was varied greatly.

To graduate the piston rod 39, direct current of 25 A was passed through the terminals 31 and 32 and the piston 39 was rotated at a speed of 20 mm/sec. After graduation the piston rod 39 was finished by grinding and a chromium plating was applied to its surface to a thickness of 20μ to improve wear resistant property.

EXAMPLE 2

This example shows data for a small size die casting machine.

diameter of piston rod—30 mm
material of piston rod—SCM415

|  | Japanese Industrial Standards (JIS) |
|---|---|
| pitch of graduation | 2 mm |
| width of modified portion | 1 mm |
| depth of modified portion | 200μ |
| voltage of battery | 5 V |
| output voltage (peak to peak) |  |
| 25.0 mV piston speed | 0.5 m/sec. |
| 24.6 mV piston speed | 5 m/sec. |

In this example, the piston rod was graduated with a carbon dioxide gas laser beam having an output of 300 W while rotating at a speed of 50 mm/sec.

The piston rod of this example has a cross-section similar to that shown in FIG. 2, but different therefrom in that the permeability of the modified portions was reduced to 1/15 thus increasing their reluctance. For this reason, the waveform of the output voltage Vo was reversed as shown in FIG. 13 (compare it with FIG. 12).

EXAMPLE 3

In this example, the measuring scale was used as a mere measuring device for measuring the displacement of the hammer of a high speed metal shaping machine.

diameter of metallic scale—15 mm
material of scale—25 wt% of Fe and 75 w% of Ni
pitch of graduation—2 mm
width of modified portion 4—1 mm
depth of modified portion 4—200μ
voltage of battery—5 V
output voltage (peak to peak):
 46.0 mV—speed of scale—0.5 m/sec.
 45.5 mV—speed of scale—7 m/sec.

In this example, the metallic scale was prepared by the first method.

The sensor for converting the displacements of the metal scale utilized in Examples 1-3 into electric signals is available on the market. The result of our exhaustive research shows that any magnetic material that changes its permeability by heat treatment effected by a high energy beam or electric current can be used in this invention and that the only factor that determines the material is its price.

We claim:

1. A method of preparing a metallic scale comprising the steps of:
   preparing a linear metallic blank provided with a plated layer of a metal alloy consisting of 92–95% by weight of nickel and 5–8% by weight of phosphorus; and
   applying, at a definite spacing, high density energy in the form of a fine line onto a surface of said plated layer so as to change permeability of portions of said plated layer subjected to said high density energy;
   said permeability changed portions forming graduations of said metallic scale.

2. The method according to claim 1 wherein the permeability of said portions is sensed by a magnetic sensor when said metallic scale is moved relative to said sensor.

3. The method according to claim 1 wherein the method of applying high density energy is selected from the group consisting of a fine beam of laser rays, a fine beam of electrons, a fine beam of ions and a fine beam of plasma.

4. The method according to claim 1 wherein said high density energy is applied by passing electric current through said blank via a roller electrode having a sharp periphery edge brought into a line contact with the surface of said blank.

5. The method according to claim 1 wherein said modified portions comprise a plurality of annular circumferential portions of said bar which are uniformly spaced apart in the axially direction of said bar.

6. The method according to claim 1 wherein said modified portions are formed helically about a periphery of said bar.

7. The method according to claim 1 wherein said linear blank is provided with a plated film of a metal alloy containing a magnetic metal which changes its permeability when subjected to said high density energy.

8. The method according to claim 7 wherein said metal alloy comprises a nickel-phosphor alloy.

9. A metallic scale produced by the method of claim 1.

10. A metallic scale produced by the method of claim 2.

11. A metallic scale produced by the method of claim 3.

12. A metallic scale produced by the method of claim 4.

13. A metallic scale produced by the method of claim 5.

14. A metallic scale produced by the method of claim 6.

15. A metallic scale produced by the method of claim 7.

16. A metallic scale produced by the method of claim 8.

* * * * *